United States Patent
Yalamanchi et al.

(10) Patent No.: US 9,805,076 B2
(45) Date of Patent: Oct. 31, 2017

(54) EXTENSIBLE RDF DATABASES

(71) Applicant: Oracle International Corporation, Redwood Shores, CA (US)

(72) Inventors: Aravind Yalamanchi, Lynnwood, WA (US); Matthew Perry, Bookline, NH (US)

(73) Assignee: Oracle International Corporation, Redwood Shores, CA (US)

( * ) Notice: Subject to any disclaimer, the term of this patent is extended or adjusted under 35 U.S.C. 154(b) by 70 days.

(21) Appl. No.: 13/939,555

(22) Filed: Jul. 11, 2013

(65) Prior Publication Data

US 2013/0297660 A1  Nov. 7, 2013

Related U.S. Application Data

(63) Continuation of application No. 12/966,899, filed on Dec. 13, 2010, now Pat. No. 8,489,649.

(51) Int. Cl.
*G06F 17/30* (2006.01)

(52) U.S. Cl.
CPC .. *G06F 17/30312* (2013.01); *G06F 17/30507* (2013.01)

(58) Field of Classification Search
CPC ......... G06F 17/30427; G06F 17/30448; G06F 17/30545; G06F 17/3043; G06F 17/30917; G06F 17/30979; G06F 17/30707; G06F 17/30932
USPC ........ 707/794, 795, 803, 808–810, E17.009, 707/609, 769, E17.125; 715/205, 234, 715/255; 717/112, 141, 144
See application file for complete search history.

(56) References Cited

U.S. PATENT DOCUMENTS

| | | |
|---|---|---|
| 5,108,406 A | 4/1992 | Lee |
| 5,108,420 A | 4/1992 | Marks |
| 5,192,301 A | 3/1993 | Kamiya et al. |

(Continued)

FOREIGN PATENT DOCUMENTS

| | | |
|---|---|---|
| DE | 2822603 | 3/1987 |
| DE | 4104702 | 8/1992 |

(Continued)

OTHER PUBLICATIONS

Ianni et al. "A Rule System for Querying Persistent RDFS Data" Springer-Verlag Berlin Heidelberg 2009.*

(Continued)

*Primary Examiner* — Jason Liao
*Assistant Examiner* — Berhanu Mitiku
(74) *Attorney, Agent, or Firm* — Hickman Palermo Becker Bingham LLP

(57) ABSTRACT

A method and apparatus for introducing domain-specific data types with associated semantics in an RDF database system using an extensibility framework mechanism. The extensibility framework mechanism allows users to map serialized instance data for a particular user-defined data type to properties of a base data structure associated with the domain-specific data and to map instance data in base data structures to the data's serialized form. The RDF database system may return inferred properties of RDF data stored in domain-specific data types in response to a query on the data. Further, the RDF database system may infer relationships between resources in stored data.

18 Claims, 11 Drawing Sheets

(56) References Cited

U.S. PATENT DOCUMENTS

| | | | |
|---|---|---|---|
| 5,193,533 A | 3/1993 | Body | |
| 5,234,458 A | 8/1993 | Metais | |
| 5,334,217 A | 8/1994 | Das | |
| 5,404,513 A | 4/1995 | Powers et al. | |
| 5,425,744 A | 6/1995 | Fagan et al. | |
| 5,433,727 A | 7/1995 | Sideris | |
| 5,486,193 A | 1/1996 | Bourne et al. | |
| 5,514,112 A | 5/1996 | Chu et al. | |
| 5,536,274 A | 7/1996 | Neuss | |
| 5,683,411 A | 11/1997 | Kavteladze et al. | |
| 5,709,707 A | 1/1998 | Lock et al. | |
| 5,733,294 A | 3/1998 | Forber et al. | |
| 5,795,322 A | 8/1998 | Boudewijn | |
| 5,853,422 A | 12/1998 | Huebsch et al. | |
| 5,861,003 A | 1/1999 | Latson et al. | |
| 5,878,415 A | 3/1999 | Olds | |
| 5,974,407 A | 10/1999 | Sacks | |
| 5,987,506 A | 11/1999 | Carter et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,123,715 A | 9/2000 | Amplatz | |
| 6,128,610 A | 10/2000 | Srinivasan et al. | |
| 6,141,655 A | 10/2000 | Johnson et al. | |
| 6,199,195 B1 | 3/2001 | Goodwin et al. | |
| 6,208,993 B1 | 3/2001 | Shadmon | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,298,349 B1 | 10/2001 | Toyoshima et al. | |
| 6,343,287 B1 | 1/2002 | Kumar et al. | |
| 6,355,052 B1 | 3/2002 | Neuss et al. | |
| 6,356,920 B1 | 3/2002 | Vandersluis | |
| 6,366,934 B1 | 4/2002 | Cheng et al. | |
| 6,391,036 B1 | 5/2002 | Berg et al. | |
| 6,418,448 B1* | 7/2002 | Sarkar | G06F 17/30893 |
| 6,470,344 B1 | 10/2002 | Kothuri et al. | |
| 6,487,546 B1 | 11/2002 | Witkowski | |
| 6,496,842 B1 | 12/2002 | Lyness | |
| 6,708,186 B1 | 3/2004 | Claborn et al. | |
| 6,772,350 B1 | 8/2004 | Belani et al. | |
| 6,785,673 B1 | 8/2004 | Fernandez et al. | |
| 6,836,778 B2 | 12/2004 | Manikutty et al. | |
| 6,966,914 B2 | 11/2005 | Abe | |
| 7,097,653 B2 | 8/2006 | Freudenthal et al. | |
| 7,788,213 B2 | 8/2010 | Friedlander | |
| 7,979,455 B2* | 7/2011 | Krishnamoorthy | G06F 17/30427 707/761 |
| 8,190,643 B2* | 5/2012 | Oliver et al. | 707/791 |
| 2001/0037345 A1 | 11/2001 | Kiernan et al. | |
| 2003/0009361 A1 | 1/2003 | Hancock et al. | |
| 2003/0065659 A1 | 4/2003 | Agarwal et al. | |
| 2003/0093672 A1 | 5/2003 | Cichowlas | |
| 2003/0140308 A1 | 7/2003 | Murthy et al. | |
| 2003/0182624 A1 | 9/2003 | Large | |
| 2004/0064466 A1 | 4/2004 | Manikutty et al. | |
| 2004/0088415 A1 | 5/2004 | Chandrasekar et al. | |
| 2004/0093344 A1* | 5/2004 | Berger et al. | 707/102 |
| 2004/0220912 A1 | 11/2004 | Manikutty et al. | |
| 2004/0220927 A1 | 11/2004 | Murthy et al. | |
| 2004/0230667 A1 | 11/2004 | Wookey | |
| 2005/0010896 A1 | 1/2005 | Meliksetian et al. | |
| 2006/0235823 A1* | 10/2006 | Chong et al. | 707/1 |
| 2009/0063384 A1* | 3/2009 | Cho et al. | 706/47 |
| 2009/0138498 A1 | 5/2009 | Krishnamoorthy et al. | |
| 2009/0292716 A1 | 11/2009 | Oliver et al. | |

FOREIGN PATENT DOCUMENTS

| | | |
|---|---|---|
| DE | 4222291 | 1/1994 |
| DE | 4410256 | 9/1994 |
| DE | 19604817 | 8/1997 |
| EP | 0474887 | 3/1992 |
| EP | 054091 | 6/1993 |
| GB | 1509023 | 4/1978 |
| WO | WO93/13712 | 7/1993 |
| WO | WO95/27448 | 10/1995 |
| WO | WO96/01591 | 1/1996 |
| WO | WO97/28744 | 8/1997 |
| WO | WO98/02100 | 1/1998 |
| WO | WO 01/42881 A2 | 6/2001 |
| WO | WO01/49185 | 7/2001 |
| WO | WO 01/59602 A1 | 8/2001 |
| WO | WO 01/61566 A1 | 8/2001 |
| WO | WO 2010/071245 A1 | 6/2010 |

OTHER PUBLICATIONS

Jean et al. "Querying Ontology Based Database Using OntoQL (An Ontology Query Language)" OTM 2006, LNCS 4275, pp. 704-721, 2006. Springer-Verlag Berlin Heidelberg 2006.*

Kokkinidis et al. "Query Processing in RDF/S-Based P2P Database Systems" Institute of Computer Science—FORTH, Heraklion, Greece and Department of Computer Science, University of Crete, Heraklion, Greece Mar. 15, 2006.*

Srinivasan, J. et al., "Extensible Indexing: A Framework for Integrating Domain-Specific Indexing Schemes into Oracle 8i" International Conference on Data Engineering (ICDE) 2000 (10 pages).

"Extensions in ARQ" downloaded from the Internet on Feb. 23, 2011 < http://openjena.org/ARQ/extension.html > (4 pages).

"Resource Description Framework" downloaded from the Internet on Feb. 23, 2011 < http://en.wikipedia.org/wiki/Resource_Description_Framework > (12 pages).

"SPARQL" downloaded from the Internet on Feb. 23, 2011 < http://en.wikipedia.org/wiki/Sparql > (3 pages).

The International Searching Authority, International Application No. PCT/US2011/064204, International Search Report and the Written Opinion, mailed Feb. 29, 2012, 16 pages.

Current Claims for PCT International Application No. PCT/US2011/064204, 4 pages.

Broekstra J. et al., "Sesame: An Architecture for Storing and Querying RDF Data and Schema Information", Semantics for the www, MIT press, Jan. 1, 2001, XP009156742, pp. 1-16.

Heymans S. et al., "Ontology Reasoning With Large Data Repositories", Ontology Management: Semantic Web, Jan. 1, 2008, XP009156745, pp. 1-30.

Magkanaraki A. et al., "Ontology Storage and Querying", Technical Report, Foundation for Research and Technology Hellas Institute of Computer Science Information Systems Laboratory, Apr. 1, 2002, XP002588158, pp. 1-21.

Harris S. et al., "SPARQL Query Processing with Conventional Relational Database Systems", Web Information Systems Engineering—Wise 2005 Workshops Lecture Notes in Computer Science (LNCS) Springer, Berlin, Dec. 31, 2005, XP002588477, pp. 1-10.

R. Bourret et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann et al., "Beyond Schemas, Schema Adjuncts and the Outside World," Markup Languages, Online!, vol. 2, No. 3, Jun. 2000, pp. 1-8.

Mi-Ok Chae et al., "Design and Implementation of an Object-Oriented Multimedia DBMS Tightly Coupled with Information Retrieval Functions," Proc. 17th IASTED International Conference on Applied Informatics, Feb. 15-18, 1999. Abstract.

J. Shanmugasundaram et al., "Querying XML Views of Relational Data," Proc. 27th International Conference on Very Large Databases, Rome, Italy, Sep. 2001, pp. 261-270.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

(56) References Cited

OTHER PUBLICATIONS

Choi, Byron et al., "The XQuey Formal Semantics: A Foundation for Implementation Optimization," May 31, 2002, IEEE XP-002353605, 15 pages.

Josephine Cheng, et al., "IBM DB2 XML Extender, An end-to-end solution for storing and retrieving XML documents," IEEE, ICDE '00 Conference, San Diego, Feb. 2000, 128 pages.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the 27th Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Oracle Corporation, "Oracle9i XML Database Developer's Guide—Oracle XML DB," Release 2 (9.2), Mar. 2002, Part No. A96620-1, pp. 5-8-5-10, 5-21-5-24, 5-52-5-70, 10-5-10-20 and 11-1-11-20.

W3C, "XML Schema Part 1: Structures," W3C Recommendation, May 2, 2001, http://www.w3.org/TR/2001/REC-xmlschema-1-20010502/, pp. 1-203 (text.

W3C, "XML Schema Part 2: Datatypes," W3C Recommendation, May 2, 2001, http://www.w3.org/TR/2001/REC-xmlschema-2-20010502/, pp. 1-146 (text provided on CD-ROM).

Dayen, I., "Storing XML in Relational Databases", XML.com XP-002275971(1998-2004) pp. 1-13.

Hierarchical Queries, XP-002295972, pp. 8-3 to 8-7.

PCT/US2004/010018—International Search Report and Written Opinion (14 pages).

PCT/US2004/010018—current claims.

Jim Melton, "ISO-ANSI Working Draft, XML-Related Specifications (SQL/XML)," WG3: DRS-020, H2-2002-365, Aug. 2002, 154 pages.

Peng, Feng et al., Xpath Queries on Streaming Data, dated 2003, ACM Press, 12 pages.

Jean-Yes Vio-Dury, Xpath on Left and Right Sides of Rules: Toward Compact XML Tree rewriting Through Node Patterns, dated 2003, ACM Press, 7 pages.

Das et al, "Experimental Atrial Septal Defect Closure With a New, Transcatheter, Self-Centering Device", Circulation, dated 1993, pp. 1754-1764, vol. 88.

Extending INFORMIX Universal Server: Data Types, Version 9.1, dated Mar. 1997, Informix Software Inc., 165 pages.

\* cited by examiner

| | | | |
|---|---|---|---|
| 310 | edb:upper | rdf:type | rdfext:ExtensionFunction |
| 320 | edb:upper | rdfext:hasArguments | _:arglist |
| 330 | _:arglist | rdf:first | xsd:string |
| 340 | _:arglist | rdf:rest | rdf:nil |
| 350 | edb:upper | rdfext:hasReturnType | xsd:string |
| 360 | edb:upper | rdfext:hasSQLImplemenation | "UPPER"^^xsd:string |

| | | |
|---|---|---|
| 502 | ogc:Geometry | rdf:type | rdfs:Class |
| 504 | ogc:hasGeometry | rdf:type | owl:DatatypeProperty |
| 506 | ogc:hasGeometry | rdfs:domain | ogc:Geometry |
| 508 | ogc:hasGeometry | rdfs:range | ogc:GMLType |

```
602  geo:Nashua    rdf:type         :City
604  geo:Nashua    rdf:type         ogc:Geometry
606  geo:Nashua    :hasName         "Nashua"^^xsd:string
608  geo:Nashua    ogc:hasGeometry
                   "<gml:Polygon ...>
                      <gml:outerBoundaryIs>
                        <gml:LinearRing>
                          <gml:coordinates>
                            42.90,-71.623 42.88, ..
                          </gml:coordinates>
                        </gml:LinearRing>
                      </gml:outerBoundaryIs>
                    </gml:Polygon>"^^ogc:GMLType
```

```
TYPE BODY rdf_spatial_type AS BEGIN
  -- get GML for a given instance of SDO_GEOMERTY --
  FUNCTION getSerializedRepr (sdoobj sys.AnyData) return sys.XMLType is
  BEGIN .. END;

-- get SDO_GEOMERTY instance for a given GML document --
  FUNCTION getSQLRepr (gml sys.XMLType) return sys.AnyData is
    sdoobj SDO_GEOMETRY = SDO_GEOMETRY();    -- empty object --
  BEGIN
    sdoobj.sdo_ordinates := gml.extact('//gml:coordinates');
    ..
    if (gml.existsNode('/gml:Polygon/../gml:LinearRing') = 1)
      sdoobj.sdo_gtype := 23;    // internal db repr for linear ring
    end;
    ..
    return sys.AnyData.convertObject(sdoobj);
  END;
END;
```

| | | |
|---|---|---|
| 752 | ogcorcl:gml2sdoGeometryMap | rdf:type | edb:RDFTypeAttrMap |
| 754 | ogcorcl:gml2sdoGeometryMap | edb:hasMappings | _:maplist |
| 756 | _:maplist | rdf:first | _:geoCoordinates |
| 758 | _:geoCoordinates | edb:sourceXPath | "gml:coordinates"^^xsd:string |
| 760 | _:geoCoordinates | edb:destAttribute | "sdo_ordinates"^^xsd:string |
| 762 | _:maplist | rdf:rest | _:maplist2 |
| 764 | _:maplist2 | rdf:first | _:geoType |
| 766 | _:geoType | edb:sourceCaseExpr | _:geoTypeCase |
| 768 | _:geoTypeCase | rdf:first | _:linearRingCase |
| 770 | _:linearRingCase | edb:whenXPathExists | "/gml:Polygon/
../gml:LinearRing"^^xsd:string |
| 772 | _:linearRingCase | edb:sourceValue | "23"^^xsd:integer |
| 774 | _:geoTypeCase | rdf:rest | _:getTypeCase2 |

<<.. more case statements to determine the value to be assigned to geoType attribute>>

| | | | |
|---|---|---|---|
| 776 | _:geoType | edb:destAttribute | "sdo_geotype"^^xsd:string |

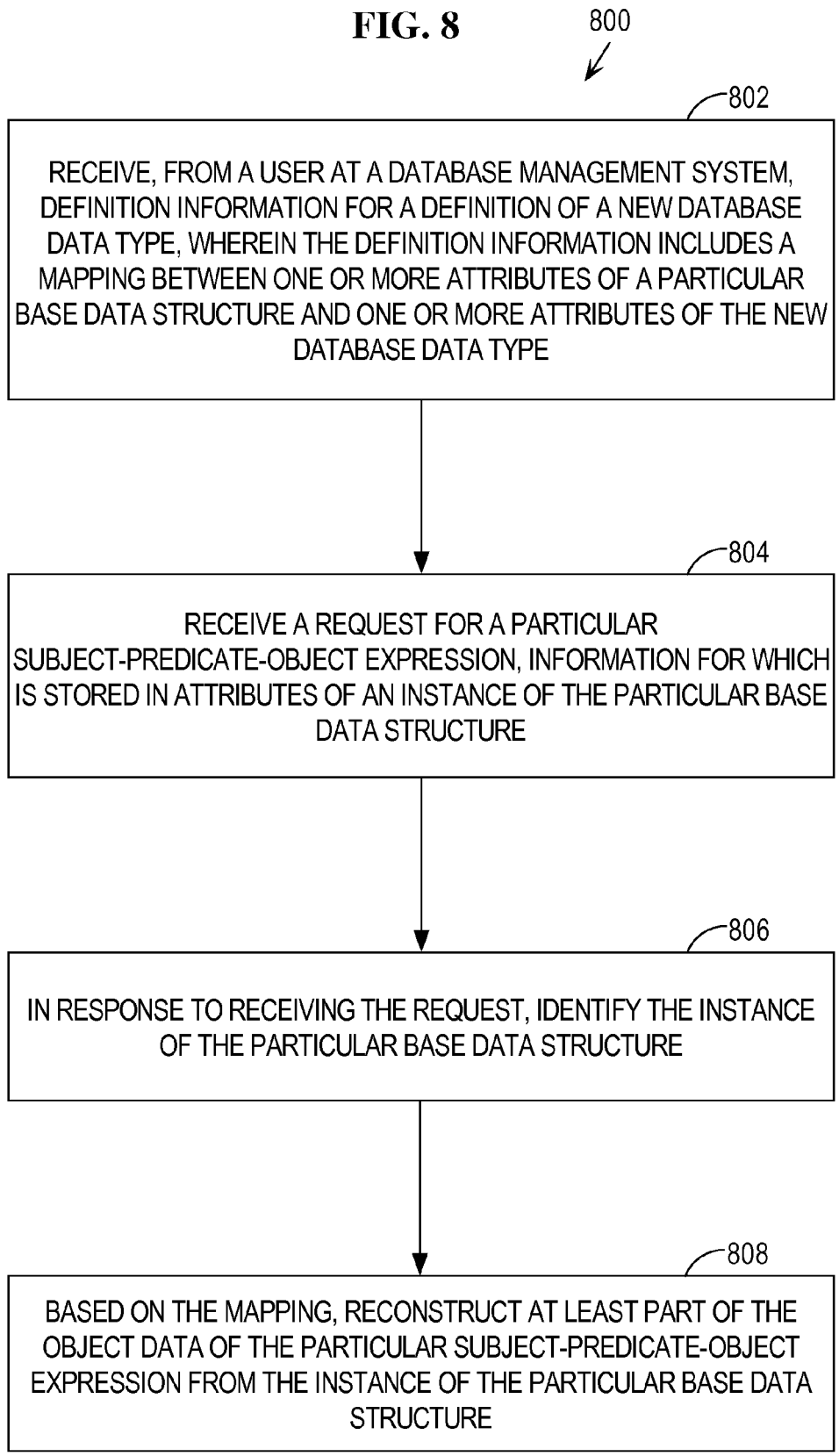

902 ogc:hasGeometry(?gobj, ?geo) ^
  904 builtIn (edb:getEnvelope, ?geo, ?egeo) →
    906 ogc:hasEnvelope(?gobj, ?egoe)

910

912 ogc:hasGeometry(?fobj, ?fgeo) ^
  914   ogc:hasGeometry(?sobj, ?sgeo) ^
  916   builtIn (edb:intersects, ?fgeo, ?sgeo, "true"^^xsd:boolean ) →
    918 ogc:intersects(?fobj, ?sobj)

EXTENSIBLE RDF DATABASES

CROSS-REFERENCE TO RELATED APPLICATIONS

This application is a Continuation of U.S. patent application Ser. No. 12/966,899, filed Dec. 13, 2010, now U.S. Pat. No. 8,489,649, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 12/188,267, titled "DATABASE-BASED INFERENCE ENGINE FOR RDFS/OWL CONSTRUCTS", and International Patent Appln. No. PCT/US2006/014196, titled "INTEGRATING RDF DATA INTO A RELATIONAL DATABASE SYSTEM", the contents of both of which are incorporated by reference as if fully set forth herein.

FIELD OF THE INVENTION

The present invention relates to an extensibility framework mechanism in an RDF database, and more particularly to facilitating introducing user-defined data types with associated semantics into an RDF database and inferring properties of data stored as a user-defined data type.

BACKGROUND

In the RDF data model, the data is modeled as labeled and directed graphs, represented as a set of triples. The nodes in the graph are used to represent two parts of a given triple, and the third part is represented by a directed link that describes the relationship between the nodes. In the context of an RDF expression, the two nodes are referred to as "subject" and "object" and the link describing the relationship is referred to as "predicate".

The subject and object of a particular RDF expression may be resources that are identified by Uniform Resource Identifiers (URIs). A predicate is also represented by a URI. A URI includes a prefix that may refer to an electronic location on the Internet, or may refer to a namespace within a database system. For example, standard prefixes "rdf:", "rdfs:" and "xsd:" are generally defined as follows:

Prefix "rdf:"; namespace URI: http://www.w3.org/1999/02/22-rdf-syntax-ns#
Prefix "rdfs:"; namespace URI: http://www.w3.org/2000/01/rdf-schema#
Prefix "xsd:"; namespace URI: http://www.w3.org/2001/XMLSchema#

Prefixes, such as "ogc:", and "edb:", may be defined within a database system to refer to a personal or other namespace in the system.

Instead of a resource, the object of a particular RDF expression may be a literal of some well-defined data type, e.g., "xsd:string", "xsd:integer", "xsd:float", "xsd:double", "xsd:boolean", "xsd:dateTime", "xsd:decimal", etc. Many literals are found within the "xsd:" namespace, however, literals may be defined within any number of namespaces. An RDF database system generally includes mappings between literals and the corresponding data types as supported by the host database management system. For example, when an RDF database system is implemented as a SQL application, the "xsd: string" data type in RDF may be mapped to a "VARCHAR2" data type in the database management system.

The properties that describe a resource are broadly classified into object-type properties and data-type properties. Object-type properties describe a subject resource, indicated by a URI in the subject position of a triple, using another resource in the object position of the triple, also identified by a URI. On the other hand, a data-type property describes a subject resource using a literal in the object position of the triple. In the following example, Triple 1 is an object-type property and Triple 2 is a data-type property.

| | |
|---|---|
| Triple 1: | <http://www.geonames.org/states/NewHampshire> |
| | <http://www.geonames.org/pred/hasCity> |
| | <http://www.geonames.org/cities/Nashua> |
| Triple 2: | <http://www.geonames.org/cities/Nashua> |
| | <http://www.geonames.org/pred/hasName> |
| | "Nashua"^^xsd:string |

SPARQL, which stands for SPARQL Protocol and RDF Query Language, is an example of an RDF query language. SPARQL is based on triple graph pattern matching and was standardized by the W3C in January 2008. In a SPARQL triple graph pattern, any or all of the subject, object, and predicate may be a variable. (See "SPARQL Query Language for RDF," W3C Recommendation 15 Jan. 2008, found at the time of writing this specification in the folder TR/rdf-sparql-query/ at the domain www.w3.org, the entirety of which is incorporated by reference herein.) The W3C recommendation for SPARQL indicates that "[a] basic graph pattern matches a subgraph of the RDF data when RDF terms from that subgraph may be substituted for the variables and the result is RDF graph equivalent to the subgraph." (See id.)

A basic SPARQL query may include a SELECT clause, a WHERE clause, and one or more query variables. A SPARQL query may also include one or more PREFIX bindings, a FILTER clause, a FROM clause, a FROM NAMED clause, a GRAPH clause, an ORDER BY clause, etc. An example SPARQL Query 1 is shown below:

| Query 1: | |
|---|---|
| SELECT | ?x |
| WHERE { | <http://www.geonames.org/cities/Nashua> |
| | <http://www.geonames.org/pred/hasName>  ?x |
| } | |

Query 1 selects all RDF triples with objects that have the relation "<http://www.geonames.org/pred/hasName>" to the subject resource "<http://www.geonames.org/cities/Nashua>". Referring to Triples 1 and 2 above, the result returned from Query 1 would be: "Nashua" ^^xsd:string.

Existing systems hardwire both mappings between the logical and physical representations of RDF data, and mappings between SPARQL query-constructs and corresponding constructs in the underlying host system. Such hardwired mappings make extending RDF database systems expensive and error prone in light of new requirements from emerging application domains. Open-source database systems allow end-user modifications to the core components. However, this approach often leads to one-off specializations that are not reusable and hard to maintain.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates a set of example triples that may be used to add a user-defined function as metadata to an RDF database.

FIG. 5 illustrates a set of RDF data that defines properties of a new class and a new data-type property in a database.

FIG. 6 illustrates RDF data that may be stored in an RDF database.

FIG. 7A illustrates a sample expression for implementing a mapping between a user-defined data type and a base data structure.

FIG. 7B illustrates RDF data that defines a mapping between serialized data for a user-defined data type and a base data structure in a DBMS using RDF-type data.

FIG. 8 is a flowchart that illustrates reconstructing serialized domain-specific data from data stored in a base data structure in a database system.

FIG. 9 illustrates inference rules, which allow an RDF database to infer relationships between RDF resources and to infer properties of the resources.

DETAILED DESCRIPTION

Figure 1:
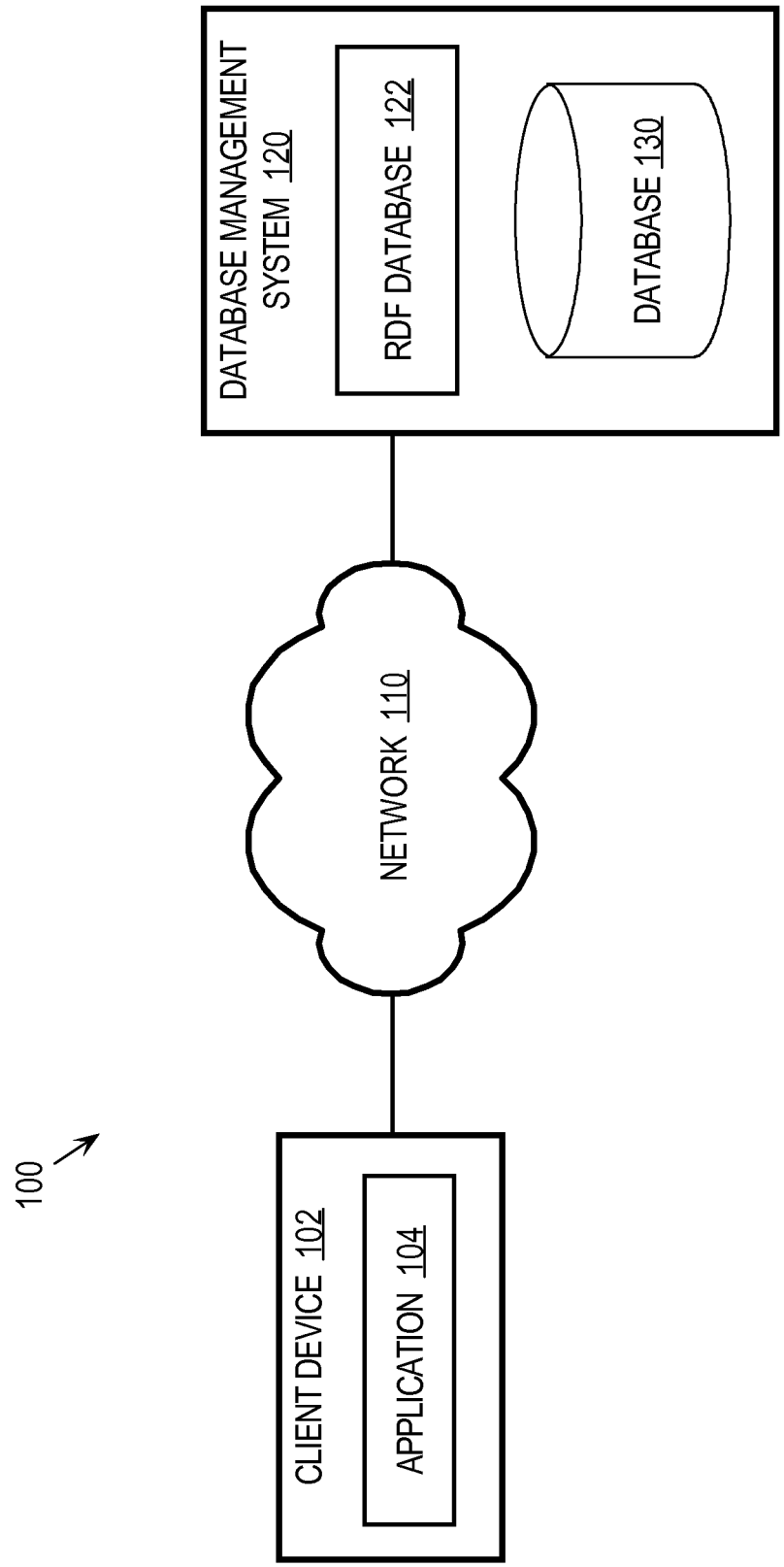
FIG. 1 is a block diagram that depicts an example network arrangement for an RDF database with an extensibility framework mechanism.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

User-defined functions and domain-specific data types with associated semantics can be introduced in an RDF database system using an extensibility framework mechanism in the RDF database system. The extensibility framework mechanism allows users to map serialized instance data for a particular user-defined data type to properties of a base data structure associated with the domain-specific data and to map instance data in base data structures to the data's serialized form. The RDF database system may return inferred properties of RDF data stored in domain-specific data types in response to a query on the data. Further, the RDF database system may infer relationships between resources in stored data.

Extensibility Framework Mechanisms

Database extensibility refers to the ability to include new functionality in a database system without requiring a re-architecture of the system. Database extensibility is commonly achieved using an extensibility framework mechanism that may include a combination of software and data. For example, an extensibility framework mechanism may include Application Programming Interfaces (APIs) or other well-defined interfaces that allow a user to implement functions, data types, indexes, etc., for use within a host database management system. An extensibility framework mechanism may also include data that maps user-implemented structures to base data structures in the host database management system and mechanisms for rewriting queries based on data stored at the extensibility framework mechanism or at the host system, etc.

Such an extensibility framework mechanism allows users to plug domain-specific logic, which supplements native database functionality, into the database system. The well-defined interfaces in an extensibility framework mechanism allow a user-defined data type to interact with core database components when the interfaces are implemented for a specific user-defined data type. For example, a mechanism, implemented through an extensibility framework mechanism, for indexing spatial data that is stored in relational tables should implement interfaces that are invoked for any data manipulation operations on the tables that are required for the indexing. The interface functions include domain-specific logic to make necessary modifications to the index data. As a further example, a user-defined function, added to the functionality of a relational database system through an extensibility framework mechanism, may have access to the core relational database system components that can be used to optimize the function. Such functions may be used in a query in the same manner as functions that are built into the database system may be used in queries.

Adding new database functionality through extensibility framework mechanisms has significant benefits over integrated approaches, which often involve re-architecting the database system at a significant cost. While many relational database systems offer extensibility framework mechanisms for extending the relational database's functionality with user-defined functions, data types, operators, access methods and/or indexes, extensibility framework mechanisms that allow for the same breadth of functionality do not exist for database systems that support Resource Description Framework (RDF) data models.

Inherent differences between conventional database systems and the RDF data model introduce unique challenges for extensibility. To illustrate, a database system handling RDF data and queries thereon, such as SPARQL queries, often runs on top of a host environment that supports some primitive operations. Thus, an implementation of the RDF data model typically captures RDF expressions with the aid of ontologies, standard vocabularies, and other capabilities of the host environment on which the implementation runs.

For example, an RDF database system may be implemented as a SQL application on a relational database management system, which natively stores data in relational tables and allows SQL queries on the data. Such systems, while presenting a logical RDF view of the data, physically store the data in relational tables, generally using a proprietary mapping that is often influenced by performance tradeoffs. Additionally, the SPARQL queries issued on the logical RDF data model are internally mapped to corresponding SQL on the underlying physical storage. In an alternate implementation example of an RDF database, a Java-based system may be used to store RDF data as instances of Java objects. In this implementation, queries on the RDF data may be mapped to corresponding methods in Java class libraries. For example, a reference to REGEX (an operator that is part of the SPARQL query language) in the FILTER clause of a SPARQL query may be mapped to a matching method in the java.lang.String class.

Existing systems hardwire both mappings between the logical and physical representations of RDF data, and mappings between SPARQL query-constructs and corresponding constructs in the underlying host system. Such hardwired mappings make extending RDF database systems expensive and error prone in light of new requirements from emerging application domains. Open-source database systems obviate the need for extensibility framework mechanisms by allowing end-user modifications to the core components. However, this approach often leads to one-off specializations that are not reusable and hard to maintain.

In a database management system that includes an RDF database (see, e.g., the system of FIG. 1 described below), the database management system may include one or multiple extensibility framework mechanisms. For example, a first extensibility framework mechanism may be associated with the database management system and a second extensibility framework mechanism may be associated with the RDF database specifically. Further, a single extensibility framework mechanism may service both the RDF database and the database management system as a whole. For the purposes of this description, functions that are attributed to a particular extensibility framework mechanism may be performed by any extensibility framework mechanism associated with any module of the database management system or associated with the database management system itself.

Extensible RDF Database Architecture

FIG. 1 is a block diagram that depicts an example network arrangement 100 for an RDF database with an extensibility framework mechanism, according to an embodiment of the invention. Example network arrangement 100 includes a client device 102 and a database management system (DBMS) 120, communicatively coupled via a network 110.

Client device 102 may be implemented by any type of client device. Example implementations of client device 102 include, without limitation, workstations, personal computers, laptop computers, personal digital assistants (PDAs), cellular telephony devices, any other type of computing device. In example network arrangement 100, client device 102 is configured with an application 104. Application 104 may be any type of application process that makes use of DBMS 120. Client device 102 may be configured with other mechanisms, processes, and functionality, depending upon a particular implementation.

DBMS 120 may be implemented using any type of device that is capable of communicating with client device 102 over network 110. DBMS 120 may also be implemented on several such devices. DBMS 120 is configured to receive information, including queries and database updates, over network 110, e.g., through HyperText Transfer Protocol (HTTP), HyperText Transfer Protocol Secure (HTTPS), etc. DBMS 120 manages RDF database 122, which handles data according to the RDF data model and evaluates queries over stored RDF data. Data stored in RDF database 122 may or may not be stored in RDF form. For example, DBMS 120 may store RDF data in relational tables, in object classes, etc., depending on the implementation of DBMS 120. For ease of explanation, in certain examples herein DBMS 120 is assumed to be implemented as a relational database with RDF database 122 running as a SQL application. However, DBMS 120 may be implemented as a relational database system, a Java-based database system, some other object-oriented database system, a database system that natively stores RDF data, or any other implementation of a database system, with RDF database implemented appropriately for the underlying system. RDF database 122 may or may not run on the same device as DBMS 120. DBMS 120 may be further configured with other mechanisms, processes and functionalities, depending upon a particular implementation.

In example network arrangement 100, DBMS 120 is configured with database storage 130. Database storage 130 may be implemented on a device that is external to a device on which one or more components of DBMS 120 are implemented. Also, database storage 130 may be implemented on a device on which one or more components of DBMS 120 are implemented. Database storage 130 may be implemented by any type of storage, including volatile and non-volatile storage. Database storage 130 may include, without limitation, random access memory (RAM), one or more hard or floppy disks, or main memory. Furthermore, database storage 130 may not be directly connected to DBMS 120, but may be accessible to DBMS 120 over network 110.

DBMS 120 manages RDF database 122 and may manage one or more other databases. DBMS 120 may comprise one or more database servers. A server, such as a database server, is a combination of integrated software components and an allocation of computational resources, such as memory, a device, and processes on the device for executing the integrated software components on a processor, the combination of the software and computational resources being dedicated to performing a particular function on behalf of one or more clients.

A database comprises database data and metadata that is stored on a persistent memory mechanism, such as a set of hard disks, e.g., database storage 130. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients, e.g., client device 102 or application 104, interact with a database server managed by DBMS 120 by submitting to the database server commands that cause the database server to perform operations on data stored in database storage 130. A database command may be in the form of a database statement that conforms to a database language. An example language for expressing database requests is the Structured Query Language (SQL). There are many different versions of SQL, some versions are standard and some proprietary, and there are a variety of extensions. Another example language for expressing database requests is SPARQL, described above. Although some examples are described based on SPARQL and Oracle's SQL, the techniques provided herein are not restricted to any particular query language. Examples of other RDF query languages include Notation3 Query Language (N3QL), RDF Data Query Language (RDQL), Sesame RDF Query Language (SeRQL), etc.

Network 110 may be implemented with any type of medium and/or mechanism that facilitates the exchange of information between client device 102 and DBMS 120. Furthermore, network 110 may use any type of communications protocol and may be secured or unsecured, depending upon the requirements of a particular application.

User-Defined Functions

When data is accessed in RDF database 122, functions may be used to transform and test the data values involved in the data access. The SPARQL standard includes a set of built-in functions and has provisions for extension functions. Within a standard SPARQL query, functions can be used, e.g., in the FILTER clause, to apply certain constraints on the query results. For example, the following predicate may be used in the FILTER clause of a SPARQL query:
STR(?x)=STR(?y)
This predicate uses the STR( ) function, which strips any data type information for any literal values passed into the function. The STR function is one possible example of a function that is built into the SPARQL standard. Such standard functions may be included in RDF database 122 and implemented without using an extensibility framework mechanism. Alternatively, standard SPARQL functions may be implemented using the extensibility framework mechanism of RDF database 122.

An extensibility framework mechanism allows a user to plug user-defined functions into RDF database 122. For example, a user may create a user-defined function that maps a SPARQL extension function to a corresponding construct in DBMS 120. The extensibility framework mechanism makes use of mappings of literal data types to corresponding data types in DBMS 120 to map the types of an extension function's arguments and return values to the appropriate data types in DBMS 120. For example, "xsd:string" is mapped to a corresponding native data type in DBMS 120, such as VARCHAR2, or Java.lang.String, etc., depending on the implementation of DBMS 120. Mappings of literal data types to data types in DBMS 120 may be accomplished through the extensibility framework mechanism of RDF database 122, or may be included in RDF database 122 outside of the extensibility framework mechanism.

Figure 2:
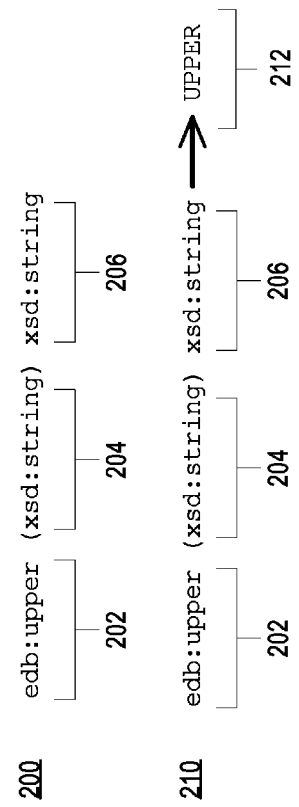
FIG. 2 illustrates information for a user-defined function that may be included in an extensibility framework mechanism.

FIG. 2 illustrates information for a user-defined function that may be included in an extensibility framework mechanism. The extensibility framework mechanism of RDF database 122 may be used to introduce, into RDF database 122, a function to transform a string value to all upper case, as illustrated by specification 200 of FIG. 2. In specification 200, term 202, "edb:upper", is the name of the user-defined function. Term 204, "(xsd: string)", identifies the type of the argument accepted by the function, and term 206, "xsd: string", identifies the function's return type.

The extensibility framework mechanism of RDF database 122 may accept the name of a construct native to DBMS 120 that supports the functionality required by a user-defined function. Continuing with example of FIG. 2, a user may identify the SQL function "UPPER" as supporting the functionality of "edb:upper", as shown in Specification 210 of FIG. 2. The information in specification 210, when entered into the extensibility framework mechanism of RDF database 122, allows RDF database 122 to appropriately evaluate "edb:upper", i.e., by calling "UPPER", when the user-defined function is invoked in a SPARQL query. A similar mapping between a user-defined function and its implementation may be specified when RDF database 122 is implemented in a different environment, such as a Java-based system.

As an alternative to defining a user-defined function programmatically, an XML- or RDF-based language may be used to declaratively add user-defined functions to RDF database 122. For example, FIG. 3 illustrates a set of example RDF data 300 that may be used to add a user-defined function as metadata to RDF database 122. Example triples 300 include terms that have the prefix "rdfext", which are terms that are defined in RDF database 122 that are used to define new entities in the extensibility framework mechanism of RDF database 122. The terms "rdfext:hasArguments", "rdfext:hasReturnType", and "rdfext:hasSQLImplementation" are examples of standard properties that a user can associate with an extension function to allow the extensibility framework mechanism to interpret the function and properly implement it. The terms that are scoped to the rdfext prefix and are used herein are example terms and may be expressed differently depending on the implementation of the invention. In one embodiment of the invention, a user may make changes to the terms in rdfext using the extensibility framework mechanism in RDF database 122.

Triple 310 indicates to the system that "edb:upper" is of type "rdfext:ExtensionFunction", which is defined as an indicator of a user-defined function. Triples 320-360 describe the semantics of the extension function "edb:upper". Specifically, triple 320 states that "edb:upper" has a list of arguments that are indicated in the rest of the triples as "_:arglist". Triples 330 and 340 enumerate the list of arguments for "edb:upper". Triple 330 states that the argument list for "edb:upper" has a first argument that is of type "xsd:string". Triple 340 indicates that there are no more arguments in the argument list, i.e., the rest of _:arglist is nil. Triple 350 indicates that the return type of "edb:upper" is of type "xsd:string".

Triple 360 states that "edb:upper" has a corresponding SQL function called "UPPER". Thus, a query transformation engine in RDF database 122 may map the function "UPPER", which is native to DBMS 120, to any instance of "edb:upper" in a SPARQL query issued to RDF database 122. Because of the semantics defined for "edb:upper" in RDF data 300, the query transformation engine can map the arguments and return value for "edb:upper" to the arguments and return value for "UPPER".

User-Defined Data Types

Domain-specific data is often complex and semi-structured. In relational database systems, domain-specific data are typically modeled using abstract data types, which may or may not have a string representation. In comparison, an RDF data model captures all forms of data using a uniform triple representation, which allows complex data to be captured as string values assigned to some data type property. In one embodiment of the invention, serialized domain-specific data is stored and processed in RDF database 122 through user-defined data types.

The extensibility framework mechanism of RDF database 122 allows definitions of user-defined data types and properties of the data types with associated semantics to be input into the DBMS 120. Through user-defined data types, RDF database 122 may manage domain-specific data, which may have special requirements for storage, indexing, and searching that are not met by base data structures in RDF database 122. Further, the extensibility framework mechanism can leverage the underlying database functionality built into base data structures to support domain-specific data types. For the purposes of this disclosure, a base data structure, is a data structure implemented in either RDF database 122 or DBMS 120. Base data structures may include optimizations for one or more of storing, indexing, and searching data. Base data structures may be native to RDF database 122 or DBMS 120, or may be implemented non-natively, e.g., through an extensibility framework mechanism for the database. A data structure, such as a data type, a function, an object, an index, etc., that is native to a database system is a data structure that is implemented in the database system without user input.

To implement a user-defined data type for a particular domain, a user provides information about the new data type to RDF database 122. The information provided by the user includes how to map serialized domain-specific data to base data structures, how to serialize domain-specific data stored in base data structures, and, optionally, one or more operators on the domain-specific data. Mapping RDF data to base data structures allows DBMS 120 to access the data in greater detail than if the data were stored in a serialized form.

Serialized domain-specific data is generally structured data. Examples of structured data include XML, tables, comma-separated values, etc. Often, a standard serialization format exists for domain-specific data. For example, Geography Markup Language (GML) is a standardized XML-type format for expressing geographical information. The data to be stored as a user-defined data type may be formatted according to a standard, such as GML, or may be formatted according to rules devised by the user, or based on some other pattern. Some examples herein are described with respect to a spatial object that is serialized using GML. However, user-defined data types may be designed to store any kind of object and may use any kind of serialization within the embodiments of the invention.

Figure 4:
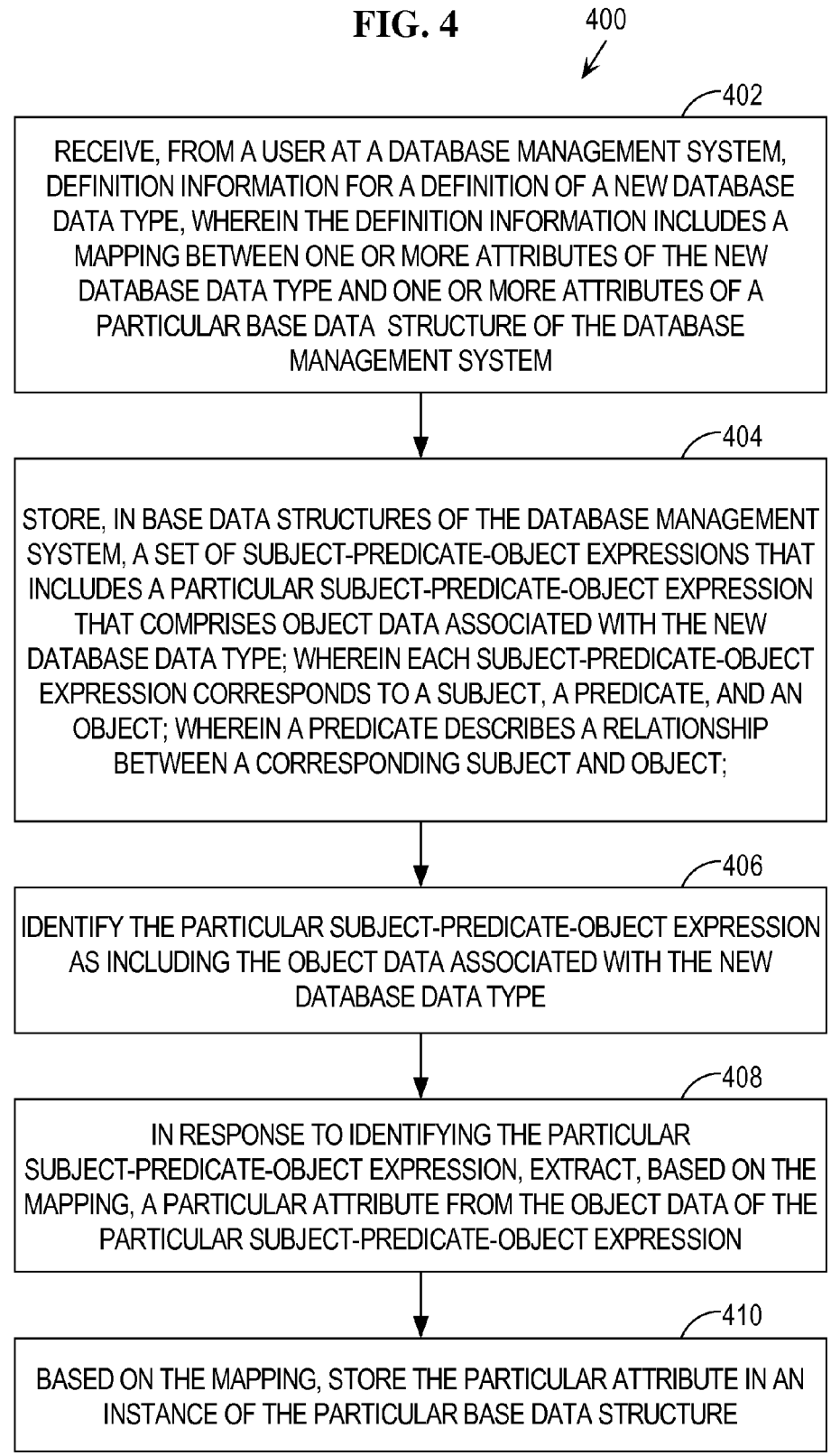
FIG. 4 is a flowchart that illustrates defining a user-defined data type in an RDF database and storing data in the database as the new data type.

FIG. 4 is a flowchart 400 that illustrates defining a user-defined data type in RDF database 122 and storing data in the database as the new data type. At step 402, definition information for a definition of a new database data type is received from a user at a database management system. For example, FIG. 5 illustrates a set of RDF data 500 that defines properties of a new class and a new data-type property in the database. A user of client device 102 (FIG. 1) may input RDF data 500 into DBMS 120 through the extensibility framework mechanism of RDF database 122. Triple 502 defines the new class "ogc:Geometry". Triple 504 defines the new data-type property "ogc:hasGeometry". This data-type property is designed to serve as a predicate in triples that are to be stored in RDF database 122, e.g., in triple 608 of FIG. 6. Triple 506 indicates that "ogc:hasGeometry" may be used as a predicate with a subject resource of type "ogc:Geometry", and triple 508 indicates that "ogc:hasGeometry" will be used with an object resource of type "ogc:GMLType", which is a user-defined data type. Data of type "ogc:GMLType" represents geometric information that is serialized according to GML.

Step 402 further indicates that the definition information includes a mapping between one or more attributes of the new database data type and one or more attributes of a particular base data structure of the database management system. The base data structure is a structure in DBMS 120 that is associated with optimizations for one or more of storing, indexing, and searching the domain-specific data for the new data type. If DBMS 120 does not include a base data structure appropriate for the user-defined data type, the data may be stored it in its original format. Furthermore, the base data structure may be a set of columns or fields chosen to represent the domain-specific data, may be an object defined natively in DBMS 120, or may be user-defined, e.g., through an extensible framework.

To illustrate step 402, a user may wish to leverage functionality that is native to DBMS 120 in dealing with the domain-specific geometrical data associated with the "ogc:GMLType" data type. Thus, in one embodiment of the invention, the extensibility framework mechanism of RDF database 122 allows the user to map instance data for "ogc:GMLType" to properties of a base data structure in RDF database 122 or DBMS 120. SDO_GEOMERTY defined in DBMS 120 manages data in the spatial domain, and the user maps "ogc:GMLTYPE" to SDO_GEOMETRY. Storing RDF data that is formatted according to GML in a base data structure provides, for the user-defined data type, the storage, indexing, and searching optimizations implemented in SDO_GEOMETRY.

A mapping between serialized data for a user-defined data type and a base data structure in a database management system such as DBMS 120 may include one-to-one, one-to-many, many-to-one, or many-to-many mappings between aspects of the serialized data and attributes of the base data structure. Further, such a mapping may include conditional statements and Boolean expressions. The user of an extensible framework mechanism may choose to implement a mapping function on DBMS 120 and refer to the function by name or, alternatively, create the mapping in RDF itself.

FIG. 7A illustrates a sample expression 700 for implementing a mapping between "ogc:GMLTYPE" and a base data structure. Sample expression 700 includes pseudocode to illustrate functions that a user may implement for a user-defined data type such as "ogc:GMLTYPE". One such function, called getSQLRepr, provides functionality for converting an instance of "ogc:GMLTYPE" data into an SDO_GEOMETRY instance. Similarly another function in sample expression 700, called "getSerializedRepr", provides functionality for the reverse mapping.

FIG. 7B illustrates RDF data 750 that defines a mapping between serialized data for "ogc:GMLTYPE" and the SDO_GEOMERTY base data structure in DBMS 120 using RDF-type data. The mapping illustrated in RDF data 750 may be expressed in many ways within the embodiments of the invention. Therefore, RDF data 750 is not the only way such a mapping may be expressed using RDF data. For user-defined data types with one-to-one mappings between the RDF and the base data structure attributes, the expression of the mapping is simple. But for other kinds of mappings, e.g., many-to-one mappings, many-to-many mappings, and mappings requiring conditional expressions, the expression of the mapping may be more advanced.

RDF data 750 includes a list of attribute maps. The attribute mapping is a list of individual mappings with first and rest, e.g., triples 754, 756, and 762 (with rest expanding into first and rest until rdf:nil). The first mapping in triples 756-760 is that of "_:geoCoordinates", which is a one-to-one mapping where a particular location in "ogc:GMLType" data corresponds to a particular attribute of SDO_GEOM-ETRY. The mapping for a second attribute, "sdo_geotype" does not have a specific source, but involves a case statement with XPath tests, as illustrated in triples 764-776. The term "_:geoTypeCase", which is the subject of triples 768 and 774, is defined as a list of Case statements with a first and rest of its own. Each case statement has a condition involving "edb:when XPathExists" and the value when the condition evaluates to true (see, e.g., triples 770-774).

A mapping that is expressed using a function (as in FIG. 7A) or RDF data (as in FIG. 7B) may be associated with the definition of a user-defined data type using a few RDF statements, such as:

| | | |
|---|---|---|
| ogc:GMLType | rdf:type | edb:ExtensibleType |
| ogc:GMLType | edb:hostType | "SDO_GEOMETRY"^^xsd:string |
| ogc:GMLType | edb:typeMapping | ogcorcl:gml2sdoGeometryMap |

In situations where the type mapping is implemented in the host system, e.g., DBMS 120, "edb:typeMapping" may refer to yet another RDF term that identifies the host function that implements the mapping, as follows:

| | | |
|---|---|---|
| ogc:GMLType | rdf:type | edb:ExtensibleType |
| ogc:GMLType | edb:hostType | "SDO_GEOMETRY"^^xsd:string |
| ogc:GMLType | edb:typeMapping | ogcorcl:gmlTypeMapFunction |
| ogcorcl:gmlTypeMapFunction | rdf:type | edb:RDFTypeMapFuncInterface |
| ogcorcl:gmlTypeMapFunction edb:interfaceName | | "rdf_spatial_type"^^xsd:string |

The triple "ogcorcl:gmlTypeMapFunction rdf:type edb:RDFTypeMapFuncInterface" indicates that "ogcorcl:gmlTypeMapFunction" is a function and the triple "ogcorcl:gmlTypeMapFunction edb:interfaceName "rdf spatial_type"^^xsd:string" tells us the name of the function. Based on the above mapping, the host system figures out that "rdf_spatial_type" is a SQL interface with necessary functions.

Continuing with the explanation of step 402 (FIG. 4), triples 756-760 of FIG. 7B indicate that the _:geoCoordinates attribute, which can be extracted with the XPath expression "gml:coordinates" in an instance of "ogc:GMLTYPE" type, is mapped to the "sdo_ordinates" attribute of the SDO_GEOMETRY base data type. The term "gml:coordinates" is a location identifier, which corresponds to an XPath expression in this case. An XPath expression is an example type of location identifier that may be used within the embodiments of the invention.

At step 404, a set of subject-predicate-object expressions that includes a particular subject-predicate-object expression that comprises object data associated with the new database data type are stored in base data structures of the database management system, wherein each subject-predicate-object expression corresponds to a subject, a predicate, and an object. A subject-predicate-object expression is a grouping of data styled as a subject, data styled as a predicate, and data styled as an object. An RDF triple is an example of data formatted as a subject-predicate-object expression. For example, FIG. 6 illustrates a set of RDF data 600 that may be stored in RDF database 122. RDF data 600 defines properties of a city resource, "geo:Nashua". Triple 602 indicates that "geo:Nashua" is of type "geo:City", where "geo:Nashua" is the subject of the triple, "rdf:type" is the predicate of the triple, and "geo:City" is the object of the triple. Triple 604 indicates that "geo:Nashua" is an instance of a Geometry object, as defined in FIG. 5 at triple 502. Triple 606 indicates that "geo:Nashua" has a name, "Nashua", which is of type "xsd:string".

Triple 608 includes the predicate "ogc:hasGeometry", as defined in triples 504-508 of FIG. 5. Through use of "ogc:hasGeometry", triple 608 associates the city resource "geo:Nashua" with an instance of the user-defined data type "ogc:GMLType". Thus, triple 608 is a subject-predicate-object expression that has object data associated with the user-defined data type "ogc:GMLType". A city resource such as "geo:Nashua" may have any number of properties associated therewith.

RDF database 122 stores triples 602-608 in base data structures. As previously indicated, a base data structure is any data structure that is implemented in RDF database 122 or in DBMS 120. For example, the base data structures that RDF database 122 uses to store triples 602-608 may be any combination of a set of columns or fields chosen to represent the domain-specific data, an object defined natively in DBMS 120, a user-defined data structure, etc.

Step 404 further indicates that a predicate describes a relationship between a corresponding subject and object. Using the example of triple 602 (FIG. 6), the predicate "rdf:type" indicates that "geo:Nashua" is of the type "geo:City". Thus, "rdf:type" defines the relationship between the subject and object of triple 602. A triple predicate may indicate any kind of relationship between a corresponding subject and object to express any relationship that is appropriate for the data.

At step 406, the particular subject-predicate-object expression is identified as including the object data associated with the new database data type. For example, upon receiving triple 608 to store, RDF database 122 identifies triple 608 as including object data of type "ogc:GMLType".

At step 408, in response to identifying the particular subject-predicate-object expression, a particular attribute from the object data of the particular subject-predicate-object expression is extracted based on the mapping. For example, triples 756-760 of FIG. 7B indicate that "_:geoCoordinates" of a "ogc:GMLType" object maps to "sdo_ordinates" of SDO_GEOMETRY. In response to determining that triple 608 includes object data of type "ogc:GMLType", RDF database 122 extracts the values necessary for creating an instance of the SDO_GEOMETRY object, including coordinates (as referred to in triples 756-760) if coordinates are present in the GML data. For this purpose, the extensible framework provides programmatic interfaces to map instances of "ogc:GMLType" to SDO_GEOMETRY instances and vice versa.

At step 410, the particular attribute is stored in an instance of the particular base data structure based on the mapping. For example, triples 756-760 of FIG. 7B indicate that "_:geoCoordinates" of an object of type "ogc:GMLType" maps to "sdo_ordinates" of an SDO_GEOMETRY instance. Based on this mapping, RDF database 122 causes DBMS 120 to create an instance of SDO_GEOMETRY. RDF database 122 stores the value of "_:geoCoordinates" from the GML data in an "sdo_ordinates" attribute of the SDO_GEOMETRY instance.

In addition to a mapping between serialized domain-specific data and a base data structure, as illustrated above, the definition of a user-defined data type includes a mapping between the base data structure storing domain-specific data and the serialized format of the data. FIG. 8 is a flowchart 800 that illustrates reconstructing domain-specific data from data stored in a base data structure in a database system.

At step 802, definition information for a definition of a new database data type is received from a user at a database management system, wherein the definition information includes a mapping between one or more attributes of a particular base data structure and one or more attributes of the new database data type. For example, FIG. 7B illustrates RDF data 750 that defines a mapping between the base data structure for domain-specific data associated with "ogc:GMLType", SDO_GEOMETRY, and the serialized format for the data. A user of client device 102 (FIG. 1) inputs RDF data 750 into the extensibility framework mechanism of RDF database 122 as part of the definition of the "ogc:GMLType" user-defined data type. Triples 756-760 indicate that "sdo_ordinates" of the SDO_GEOMETRY base data type is mapped to "_:geoCoordinates", found at the XPath "gml:coordinates" in "ocg:GMLType" data.

At step 804, a request for a particular subject-predicate-object expression is received, information for which is stored in attributes of an instance of the particular base data structure. Continuing with the previous example, RDF database 122 receives a request for the serialized version of "ogc:GMLType" data found in triple 608 (FIG. 6), which is stored in an instance of SDO_GEOMETRY according to the embodiments of the invention. An example request is illustrated in the following SPARQL Query 2, received at RDF database 122:

```
                        Query 2:
SELECT   ?geo
WHERE {  ?city    :hasName       "Nashua"^^xsd:string .
         ?city    ogc:hasGeometry ?geo }
```

At step 806, in response to receiving the request, the instance of the particular base data structure is identified. For example, in response to receiving Query 2, RDF database 122 identifies the city resource associated with the name "Nashua" in its triple stores and identifies the SDO_GEOMETRY object associated with the city resource. The base data structure instances that are associated with RDF data may be tracked in any number of ways within the embodiments of the invention.

At step 808, at least part of object data of the particular subject-predicate-object expression is reconstructed from the instance of the particular base data structure based on the mapping. For example, RDF database 122 determines from the information defining the "ogc:GMLType" data type that "sdo_ordinates" of the SDO_GEOMETRY base data type is mapped to "_:geoCoordinates" of "ogc:GMLType" data. RDF database 122 inserts the value of the "sdo_ordinates" attribute of the instance of SDO_GEOMETRY, which is associated with the "Nashua" city resource, into reconstructed "ogc:GMLType" data. Specifically, RDF database 122 places the aforementioned value of "sdo_ordinates" at a location identified by the XPath "gml:coordinates" in the instance of "ogc:GMLType" data. In one embodiment of the invention, RDF database starts with a GML template and inserts data from an SDO_GEOMETRY object into the template. In another embodiment of the invention, all instructions for data placement are included in the definition of "ogc:GMLType".

A user may implement one or more operators on the data of a user-defined data type, such as "ogc:GMLType". A user may map the name, parameters, and return value for an operator on data for a user-defined data type to a name, parameters, and return value for an operator that is known to DBMS 120, e.g., a natively-defined operator. In one embodiment of the invention, an operator for a user-defined data type is mapped to an operator for a base data structure associated with the user-defined data type.

For example, the following is a logical illustration of a mapping between a user-defined operator "ogf:relate", which operates on "ogc:GMLT" data, and an operator "mdsys.sdo_relate" that is defined in DBMS 120:

```
ogf:relate              ( mdsys.sdo_relate (
    ogc:GMLType,                mdsys.sdo_geometry,
    ogc:GMLType,         →      mdsys.sdo_geometry,
    xsd:string )                varchar2 )
      return xsd:boolean;          return integer;
```

Within the embodiments of the invention, such mapping may be done either declaratively using RDF-formatted data or programmatically. If there is no operator in DBMS 120 that corresponds to the functionality for a user-defined operator, the user can explicitly implement the functionality for the operator in an extensibility framework mechanism for DBMS 120 and then create the mapping between an RDF operator and the user-defined operator in the DBMS 120, e.g., using the extensibility framework mechanism for RDF database 122. Furthermore, if an operation is introduced in RDF database 122, and a corresponding operator does not exist in the DBMS 120, an extensibility framework mechanism for DBMS 120 can be used to first introduce the operation to DBMS 120. Subsequently, an extensibility framework mechanism associated with RDF database 122 may be used map an RDF operator to the operator that was newly created in DBMS 120.

Clients, such as client device 102 of FIG. 1, can refer to user-defined operators of user-defined data types in queries on RDF database 122. For example, a user may include "ogf:relate" in the FILTER clause of a SPARQL query. To evaluate a SPARQL query, RDF database 122 translates the SPARQL query into the query format used by DBMS 120, e.g., SQL. In order to evaluate "ogf:relate" in the SPARQL query, RDF database 122 refers to the information on the operator included in the extensibility framework mechanism. Thus, when RDF database 122 translates the SPARQL query into SQL, RDF database 122 replaces the information for "ogf:relate" with the information required for "mdsys.sdo_relate", as indicated in the definition for "ogf:relate".

Format of Extensibility Data

As shown in FIG. 5, information entered into the extensibility framework mechanism of RDF database 122 may be expressed according to RDF data principles. Thus, a new data type, or other new functionality being entered into RDF database 122 through the extensibility framework mechanism, can be stated declaratively. For example, triples 502-508 are subject-predicate-object expressions that conform to the RDF format and inform RDF database 122 of user-defined structures to implement therein.

Information entered into the extensibility framework mechanism may also be expressed conventionally. For example, the following is a superclass that defines standard functions that are to be implemented in a user-defined data type that is a subclass of the superclass:

```
TYPE extensible_rdf_type IS (
    getSerializedRepr (sql_repr  sys.AnyData)
            return sys.XMLType,
    getSQLRepr (serial_repr  sys.XMLType) return sys.AnyData
);
```

A user may implement a subclass of "extensible_rdf_type" and implement the functions of the superclass to set the semantics for a user-defined data type as follows:

```
TYPE rdf_spatial_type UNDER extensible_rdf_type IS (
-- get GML for a given instance of SDO_GEOMERTY --
    getSerializedRepr (sql_repr  sys.AnyData)
        return  sys.XMLType,
-- get SDO_GEOMERTY instance for a given GML document --
    getSQLRepr (serial_repr  sys.XMLType) return sys.AnyData
);
```

Inference in User-Defined Data Types

In one embodiment of the invention, RDF database 122 infers properties of RDF data stored in RDF database 122, which inferred properties are not made explicit in the stored data. More specifically, RDF database 122 infers properties of user-defined data types that are not materialized in RDF database 122 based on information stored for the user-defined data types or based on information computed using user-defined operators associated with the user-defined data types. Inference that is based on instance data does not necessarily involve operators that belong in the FILTER clause of a SPARQL query. Inferred properties may be broadly classified into multiple types, which include a) those properties that describe a resource using the domain-specific data, also called access properties; b) those properties that relate a resource with other resources using the domain-specific semantics, also called relationship properties; and c) those properties that are non-binary in nature.

Access Properties

Access properties are domain-specific RDF data-type properties that describe a resource. Access properties of a particular resource are functionally dependent on the domain-specific instance data associated with the same resource. Therefore, the value of an access property is not materialized in RDF database 122, but is computed as needed based on instance data stored for the associated user-defined data type and one or more rules included in the definition of the user-defined data type. These rules, referred to as inference rules, define a mapping between instance data for a user-defined data type and the value of an access property for the data type.

For example, "ogc:hasEnvelope" is an access property of "ogc:GMLType" that describes the geometry of a resource in terms of the minimum bounding box for the geometry. FIG. 9 illustrates inference rules, which allow RDF database 122 to infer relationships between RDF resources and to infer properties of the resources. The rules illustrated in FIG. 9 are exemplary rules, and may be expressed in many different ways within the embodiments of the invention.

Rule 900 of FIG. 9 defines an inference rule for "ogc:GMLType" for deriving "ogc:hasEnvelope" from "ogc:GMLType" instance data stored in RDF database 122. Specifically, rule 900 includes an antecedent (terms 902 and 904) and a consequent (term 906). Term 904 includes a user-defined function, "edb:getEnvelope" that is mapped to a "getEnvelope" function for SDO_GEOMETRY. Thus, rule 900 indicates that if a particular resource, represented by "?gobj", has an associated geometry object, represented by "?geo", AND that geometry object has an envelope, represented by "?egeo", THEN "ogc:hasEnvelope" should return the envelope represented by "?egeo" for the resource represented by "?gobj", when called on the resource. In other words, RDF database 122 can derive the "ogc:hasEnvelope" property for a geometry object if the object has associated geometry data (in GML) and the invocation of the "edb:getEnvelope" function returns the appropriate envelope.

To illustrate, RDF database 122 has stored RDF data 600 in the database's triple store according to the embodiments of the invention. RDF database 122 then receives the following SPARQL Query 3:

Query 3:

```
SELECT  ?envelope
WHERE {  ?city  :hasName  "Nashua"^^xsd:string .
         ?city  ogc:hasEnvelope  ?envelope }
```

Query 3 selects the envelope for a resource that has the name "Nashua".

The "ogc:hasEnvelope" property for "geo:Nashua" is not explicitly defined for the resource in RDF data 600. However, RDF database 122 can infer the bounding box for "ogc:hasEnvelope", as described in rule 900, using the "ogc:hasGeometry" property that is explicitly defined for "geo:Nashua" in triple 608.

RDF database 122 rewrites the query based on the mapping between "ogc:hasEnvelope" and "ogc:hasGeometry" in rule 900, as shown in the following Query 4:

Query 4:

```
SELECT  ?envelope
WHERE {  ?city  :hasName  "Nashua"^^xsd:string .
         ?city  ogc:hasGeometry  ?geo .
         ?envelope  orardf:let
             "edb:getEnvelope(?geo))"^^orardf:instruction }
```

Query 4 uses an "orardf:let" property as an assignment operator which assigns the value resulting from the object value computation to the variable in the subject position of the triple pattern.

In one embodiment of the invention, Query 3 is rewritten to Query 4 on an in-memory representation of the user-issued SPARQL query, Query 3. Query 4 is converted to SQL and is handled by DBMS 120, using a combination of look-ups into the triple store of RDF database 122 as well as evaluation of necessary functions to compute the query result. The generation of SQL for any given SPARQL query is guided by domain-specific rule declared using the extensibility framework mechanism. Query 4 may be mapped into a SQL query on relational tables storing triples, the query including the SQL equivalents for the extension functions used in the SPARQL query. DBMS 120 may perform further rewrites on Query 4 not reflected in the examples herein.

Relationship Properties

A resource may also be described in terms of its relationships with other resources, e.g., from the same domain. Properties that relate two resources in the subject and object positions of triples are known as "relationship properties", and are object-type properties. For example, a spatial application may need to describe geometric objects in terms of their relationships with other objects, such as a "river intersects a city", "city contains a park", etc. A user may define an operator to express relationships that involve a user-defined data object. For example, a user may define an "ogc:intersects" operator on "ogc:GMLType" data that indicates that a subject resource in a triple, where "ogc:intersects" is the predicate, intersects an object resource of the triple.

Binary relationships between domain-specific resources may be tested using a standard SPARQL query. The "ogc:GMLType" data type may be used to capture geometrical information about RDF entities such that the entities can be searched based on their spatial characteristics. To illustrate a SPARQL query that tests binary relationships, the following Query 5 uses "ogc:intersects" to identify all the rivers in RDF database 122 that intersect the city of Nashua:

---
Query 5:
---
```
SELECT ?riverName
WHERE { ?city   :hasName       "Nashua"^^xsd:string .
        ?river  rdf:type       :River .
        ?river  :hasName       ?riverName .
        ?river  ogc:intersects ?city }
```
---

Query 5 may be submitted by client device 102 to RDF database 122.

To evaluate Query 5, RDF database 122 logically expands the query using rules associated with user-defined structures referred to therein and translates the SPARQL query into the query format used by DBMS 120, e.g., SQL. The extensibility framework mechanism of RDF database 122 manages the semantics of the domain-specific relationship properties with the use of declarative rules that can guide the query rewrite.

For example, rule 910 of FIG. 9 defines the semantics of the "ogc:intersects" operator. The formulation of rule 910 assumes that "edb:intersects" is a user-defined function that is mapped to an "intersects" function for SDO_GEOMETRY in DBMS 120. Term 912 indicates that a first resource "?fobj" has a first geometry "?fgeo", term 914 indicates that a second resource "?sobj" has a second geometry "?sgeo", and term 916 indicates that "edb:intersects" returns the Boolean true when called for the first geometry and the second geometry. If terms 912, 914, and 916 hold true, the first resource intersects the second resource.

RDF database 122 translates Query 5 based on any domain specific rule in the database that is applicable to Query 5. The following Query 6 illustrates a logical translation that RDF database 122 may perform on Query 5 based on rule 910:

---
Query 6:
---
```
SELECT ?riverName
WHERE { ?city   :hasName       "Nashua"^^xsd:string .
        ?river  rdf:type       :River .
        ?river  :hasName       ?riverName .
        ?city   ogc:hasGeometry ?cityGeo .
        ?river  ogc:hasGeometry ?riverGeo .
        FILTER ( edb:intersects(?fgeo, ?sgeo) =
                 "true"^^xsd:boolean)}
```
---

The rewritten queries herein represent logical transformations made to SPARQL queries submitted to RDF database 122, and may not be stored or expressed in memory for RDF database 122 in the manner that is shown.

RDF database 122 evaluates Query 6 using triples stored in the repository for RDF database 122, as well as any extension functions plugged-into the system. Furthermore, when RDF database 122 is implemented as a SQL application, the SPARQL Query 6 is executed using an equivalent SQL query that accounts for any references to extension functions in the query.

Query 6 illustrates one path to determining which river resources intersect the city Nashua. Domain-specific properties may be further qualified by alternate ways of deriving a specific relationship using the same or other properties of the domain-specific data. In one embodiment of the invention, these alternate forms for deriving the domain-specific properties are expressed as multiple rules that must all be explored during query rewrite. In another embodiment of the invention, only one or more of the rules are explored during query rewrite. Thus, in one embodiment of the invention, RDF database 122 evaluates Query 5 using all paths that would result in finding River resources that intersect Nashua's geometry. For example, RDF database 122 may evaluate the following paths for determining rivers that intersect Nashua:

RDF triples stored in RDF database 122 that explicitly state that a particular river "intersects" Nashua, e.g.:
geo:MerrimackRiver ogc:intersects geo:Nashua RDF triples stored in RDF database 122 that state that a particular river intersects a geometry located in Nashua, e.g.:
geo:MerrimackRiver ogc:intersects geo:GreeleyPark RDF database 122 may determine that "geo:GreeleyPark" is located in Nashua based on the geometries of both geo:GreeleyPark and geo:Nashua, or based on a triple stored in the database that states that geo:Nashua contains geo:GreeleyPark, etc.

Geometry information for a particular river is determined to logically intersect geometry information of Nashua. RDF database 122 may use any other paths to determine the result of Query 5 that is appropriate for the data stored in the database. Furthermore, if a property involved in a query submitted to RDF database 122 is transitive, reflexive, etc., RDF database 122 may adjust the query rewrite accordingly.

Because "ogc:GMLType" is mapped to the SDO_GEOMETRY base data structure, DBMS 120 can evaluate Query 5 using query functionality, optimizations, and indexing capabilities already implemented for SDO_GEOMETRY. For example, a DBMS 120 may be able to manage a large number of SDO_GEOMETRY objects through indexing, etc. Further, DBMS 120 may include an index for SDO_GEOMETRY that DBMS 120 can utilize to determine whether any SDO_GEOMETRY object intersects another SDO_GEOMETRY object. Thus, RDF database 122 may evaluate Query 5 using such an index.

Non-Binary Properties

Some relationships between resources cannot be expressed using a binary relationship. To illustrate, "intersects", and "contains" are binary relationships. In contrast, "within distance" relates two objects in the context of a distance parameter, which tests whether a particular resource is within a particular distance from a second resource. Such a relationship is non-binary. The illustrated relationships are exemplary; many relationships qualify as binary and many others qualify as non-binary.

Relationships between resources that are not considered binary may be handled using extension functions which may be used in the FILTER clause of a standard SPARQL query. Any parameterized relationships that exist between resources, such as the "within distance" relationship, may be tested using a corresponding extension function that accepts more than two arguments. The extensibility framework mechanism for plugging-in user-defined functions may further be used to perform complex domain-specific computations within the filter clause of the query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
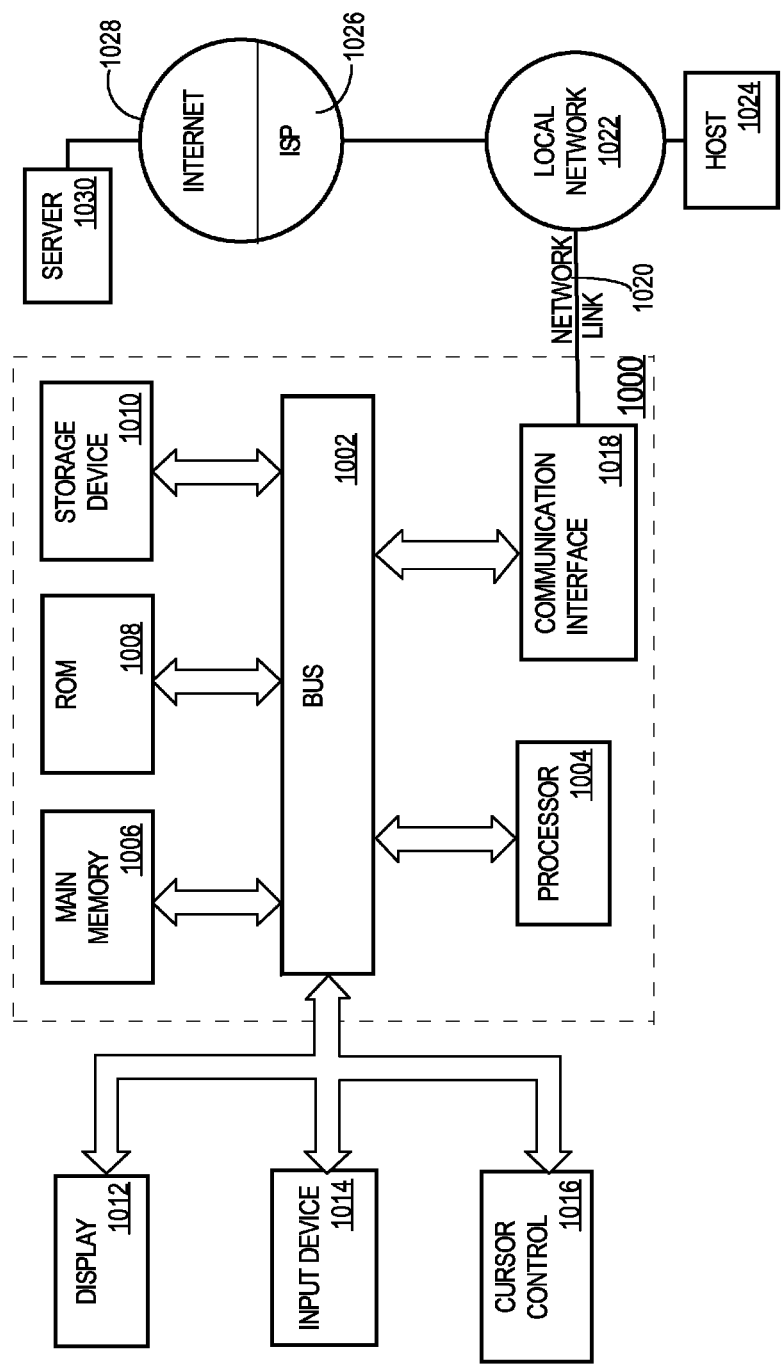
FIG. 10 is a block diagram of a computer system on which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A computer-executed method comprising:
   receiving a first query over a Resource Description Framework (RDF) database hosted by a database management system;
   wherein the first query is in an RDF query format;
   wherein the first query includes a triple with an RDF user-defined predicate, the range of which is an RDF user-defined data type;
   wherein the first query selects objects of the RDF user-defined predicate;
   wherein the RDF user-defined data type is defined based on definition information for the RDF user-defined data type stored within the RDF database;
   wherein the definition information includes a mapping between first one or more attributes of the RDF user-defined data type and second one or more attributes of a base data structure defined by the database management system;
   wherein the database management system is configured to store instances of the base data structure in a database managed by the database management system;
   wherein a particular instance of said base data structure has said one or more attributes;
   wherein the second one or more attributes of the particular instance of the base data structure holds data from which values of the first one or more attributes of the RDF user-defined data type are generated;
   evaluating the first query, to generate a result for the first query, comprising:
      retrieving data for the second one or more attributes for said particular instance of the base data structure,
      generating, as part of the result, a representation of an instance of the RDF user-defined data type that includes a particular value that is generated from the data for the second one or more attributes of the particular instance of the base data structure; and
   wherein the method is performed by one or more computing devices.

2. The method of claim 1, wherein:
   the first query refers to a property, of the instance of the RDF user-defined data type, that is not materialized in the RDF database;
   evaluating the first query comprises rewriting the first query, to produce a second query, based at least in part on one or more rules for inferring a value for the property based, at least in part, on instance data stored in the RDF database for the instance of the RDF user-defined data type.

3. The method of claim 1, wherein:
   the first query refers to a relationship property that describes a relationship between the instance of the RDF user-defined data type and another resource;
   the relationship property is not materialized in the RDF database; and
   evaluating the first query comprises rewriting the first query, to produce a second query, based at least in part on one or more rules for inferring a value for the relationship property based, at least in part, on instance data stored in the RDF database for the instance of the RDF user-defined data type.

4. The method of claim 1, wherein:
   the first query refers to a relationship property that describes a relationship between the instance of the RDF user-defined data type and another resource;
   wherein the relationship property is not materialized in the RDF database; and
   the RDF user-defined data type is associated with a plurality of inference rules for inferring the relationship property; and
   the database management system evaluating the first query comprises computing a value for the relationship property using each rule of the plurality of inference rules.

5. The method of claim 3, wherein rewriting the first query to produce the second query further comprises rewriting the first query based, at least in part, on one or more of: transitivity of the relationship property; and reflexivity of the relationship property.

6. The method of claim 1, wherein the database management system evaluating the first query further comprises evaluating the first query based on one or more extension functions.

7. The method of claim 1, wherein evaluating the first query comprises translating the first query into a query format used by the database management system.

8. The method of claim 7, wherein the query format used by the database management system is SQL.

9. The method of claim 1, wherein the first query is in a SPARQL query format.

10. One or more non-transitory computer-readable storage media storing instructions which, when executed by one or more processors, cause performance of the steps of:
   receiving a first query over a Resource Description Framework (RDF) database hosted by a database management system;
   wherein the first query is in an RDF query format;
   wherein the first query includes a triple with an RDF user-defined predicate, the range of which is an RDF user-defined data type;
   wherein the first query selects objects of the RDF user-defined predicate;
   wherein the RDF user-defined data type is defined based on definition information for the RDF user-defined data type stored within the RDF database;

wherein the definition information includes a mapping between first one or more attributes of the RDF user-defined data type and second one or more attributes of a base data structure defined by the database management system;

wherein the database management system is configured to store instances of the base data structure in a database managed by the database management system;

wherein a particular instance of said base data structure has said second one or more attributes;

wherein the second one or more attributes of the particular instance of the base data structure holds data from which values of the first one or more attributes of the RDF user-defined data type are generated;

evaluating the first query, to generate a result for the first query, comprising:
   retrieving data for the second one or more attributes for said particular instance of the base data structure,
   generating, as part of the result, a representation of an instance of the RDF user-defined data type that includes a particular value that is generated from the data for the second one or more attributes of the particular instance of the base data structure.

11. The one or more non-transitory computer-readable storage media of claim 10, wherein:
   the first query refers to a property, of the instance of the RDF user-defined data type, that is not materialized in the RDF database;
   evaluating the first query comprises rewriting the first query, to produce a second query, based at least in part on one or more rules for inferring a value for the property based, at least in part, on instance data stored in the RDF database for the instance of the RDF user-defined data type.

12. The one or more non-transitory computer-readable storage media of claim 10, wherein:
   the first query refers to a relationship property that describes a relationship between the instance of the RDF user-defined data type and another resource;
   the relationship property is not materialized in the RDF database; and
   evaluating the first query comprises rewriting the first query, to produce a second query, based at least in part on one or more rules for inferring a value for the relationship property based, at least in part, on instance data stored in the RDF database for the instance of the RDF user-defined data type.

13. The one or more non-transitory computer-readable storage media of claim 10, wherein:
   the first query refers to a relationship property that describes a relationship between the instance of the RDF user-defined data type and another resource;
   wherein the relationship property is not materialized in the RDF database; and
   the RDF user-defined data type is associated with a plurality of inference rules for inferring the relationship property; and
   the database management system evaluating the first query comprises computing a value for the relationship property using each rule of the plurality of inference rules.

14. The one or more non-transitory computer-readable storage media of claim 12, wherein rewriting the first query to produce the second query further comprises rewriting the first query based, at least in part, on one or more of: transitivity of the relationship property; and reflexivity of the relationship property.

15. The one or more non-transitory computer-readable storage media of claim 10, wherein the database management system evaluating the first query further comprises evaluating the first query based on one or more extension functions.

16. The one or more non-transitory computer-readable storage media of claim 10, wherein evaluating the first query comprises translating the first query into a query format used by the database management system.

17. The one or more non-transitory computer-readable storage media of claim 16, wherein the query format used by the database management system is SQL.

18. The one or more non-transitory computer-readable storage media of claim 10, wherein the first query is in a SPARQL query format.

* * * * *